(12) United States Patent
Obata et al.

(10) Patent No.: US 6,999,090 B2
(45) Date of Patent: Feb. 14, 2006

(54) DATA PROCESSING APPARATUS, DATA PROCESSING METHOD, INFORMATION STORING MEDIUM, AND COMPUTER PROGRAM

(75) Inventors: Satoshi Obata, Kanagawa (JP); Hajime Ishizuka, Tokyo (JP); Kosuke Suzuki, Kanagawa (JP)

(73) Assignee: Sony Corporation, (JP)

( * ) Notice: Subject to any disclaimer, the term of this patent is extended or adjusted under 35 U.S.C. 154(b) by 208 days.

(21) Appl. No.: 10/688,713

(22) Filed: Oct. 17, 2003

(65) Prior Publication Data
US 2005/0044501 A1   Feb. 24, 2005

(30) Foreign Application Priority Data
Oct. 17, 2002   (JP)   ............... 2002-303068

(51) Int. Cl.
  G09G 5/36   (2006.01)
  G06F 12/02   (2006.01)
(52) U.S. Cl. .................. 345/558; 345/557; 345/565
(58) Field of Classification Search ................ 345/558, 345/557, 565, 564, 530; 711/113
  See application file for complete search history.

(56) References Cited

U.S. PATENT DOCUMENTS

| | | | |
|---|---|---|---|
| 5,371,849 A | * | 12/1994 | Peaslee et al. ............... 345/553 |
| 5,414,455 A | * | 5/1995 | Hooper et al. ................ 725/88 |
| 6,141,728 A | * | 10/2000 | Simionescu et al. ......... 711/113 |
| 6,205,429 B1 | * | 3/2001 | Peng ........................... 704/500 |
| 6,233,389 B1 | * | 5/2001 | Barton et al. .................. 386/46 |
| 6,381,282 B1 | * | 4/2002 | Kwan et al. ............ 375/240.27 |
| 6,538,656 B1 | * | 3/2003 | Cheung et al. .............. 345/519 |
| 6,678,332 B1 | * | 1/2004 | Gardere et al. ......... 375/240.26 |

FOREIGN PATENT DOCUMENTS

| | | |
|---|---|---|
| JP | 07-236116 A1 | 9/1995 |
| JP | 08-273296 A1 | 10/1996 |
| JP | 10-145743 A1 | 5/1998 |

* cited by examiner

Primary Examiner—Kee M. Tung
Assistant Examiner—Joni Hsu
(74) Attorney, Agent, or Firm—Lerner, David, Littenberg, Krumholz & Mentlik, LLP

(57) ABSTRACT

An information storing medium storing coded data of a content in segment units stores data including information of a horizontal video size, a vertical video size, a video depth, a maximum video data size in data segments, and a maximum audio data size in data segments as header information corresponding to the content. The stored data also includes information of the first frame number within a data segment, the number of frames within the data segment, and the address of each delimiter relative to the start of the data as segment information. A content reproducing apparatus can perform FIFO setting, data reading, and reproduction processing applying these pieces of information in a cache.

14 Claims, 13 Drawing Sheets

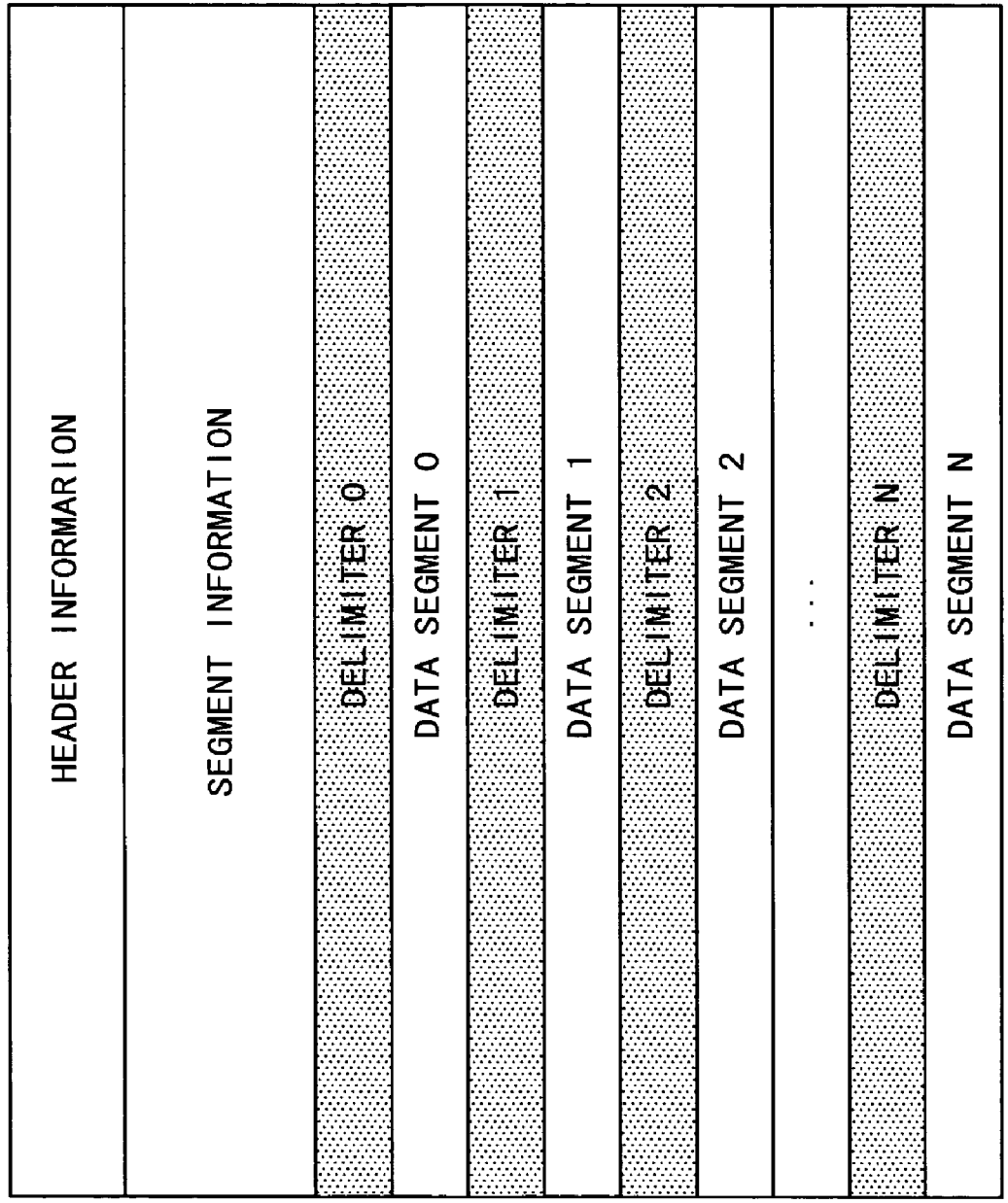

FIG. 5A

HEADER INFORMATION

```
int width;        // HORIZONTAL VIDEO SIZE
int height;       // VERTICAL VIDEO SIZE
int depth;        // VIDEO DEPTH
int maxMovieSize; // LARGEST MOVIE DATA SIZE IN DATA SEGMENTS
int maxAudioSize; // LARGEST AUDIO DATA SIZE IN DATA SEGMENTS
```

FIG. 5B

SEGMENT INFORMATION

```
int frameNumber; // FIRST FRAME NUMBER WITHIN DATA SEGMENT
int frameNums;   // NUMBER OF FRAMES WITHIN DATA SEGMENT
int addr;        // ADDRESS OF DELIMITER RELATIVE TO START OF DATA
```

FIG. 6A

DELIMITER INFORMATION

```
int frameNumber;   // FIRST FRAME NUMBER WITHIN DATA SEGMENT
int frameNums;     // NUMBER OF FRAMES WITHIN DATA SEGMENT
int movieSize;     // MOVIE DATA SIZE WITHIN DATA SEGMENT
int audioSize;     // AUDIO DATA SIZE WITHIN DATA SEGMENT
```

FIG. 6B

DATA SEGMENT INFORMATION

- MOVIE DATA (SIZE INDICATED BY DELIMITER)
- AUDIO DATA (SIZE INDICATED BY DELIMITER)

(*) EACH PIECE OF DATA NEEDS TO BE CLOSED WITHIN SEGMENT
EXAMPLE) MOVIE DATA: MPEG2 CLOSED GOP 15 FRAMES
AUDIO DATA: STRAIGHT PCM 48 kHz 24024 SAMPLES

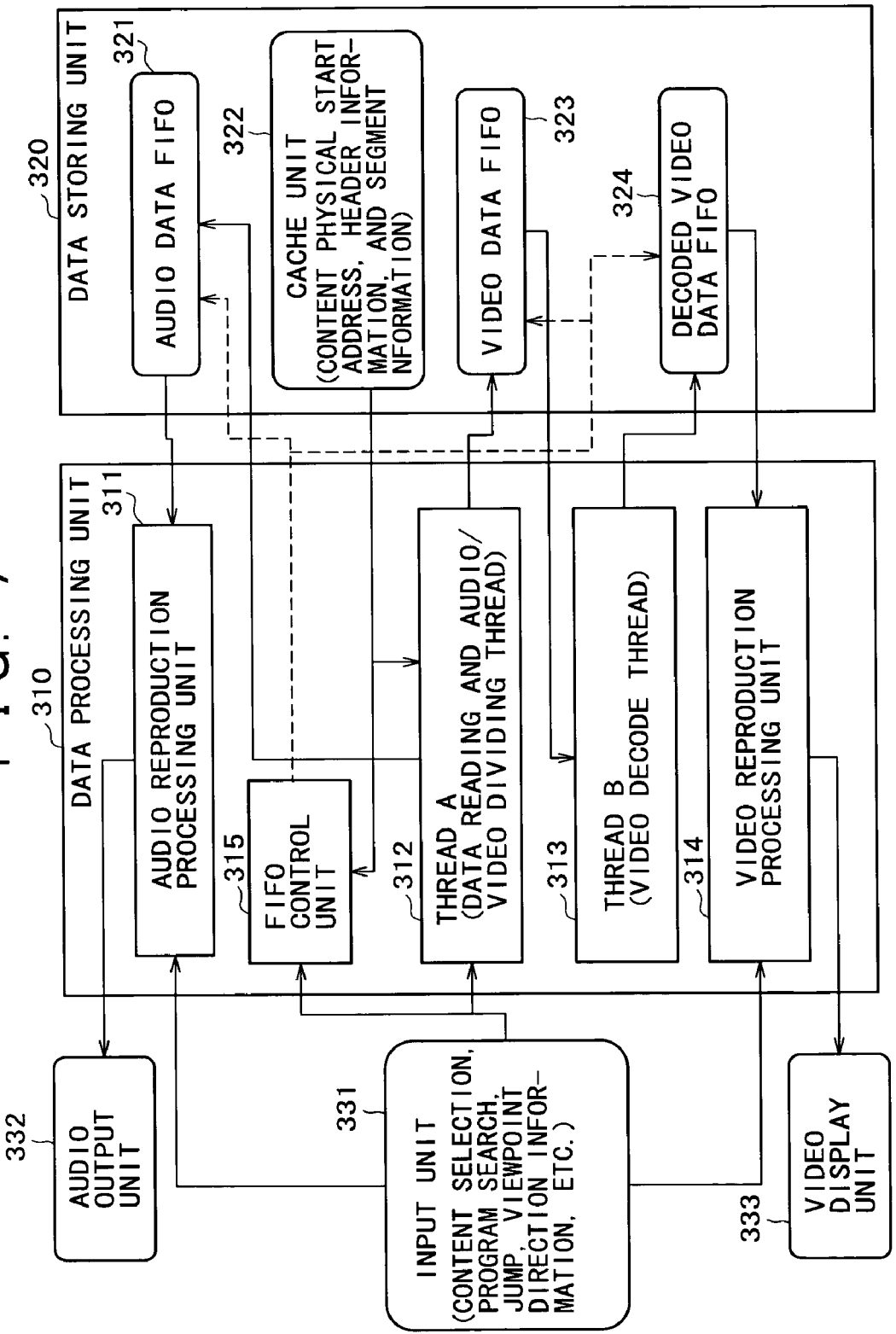

F I G. 1 1
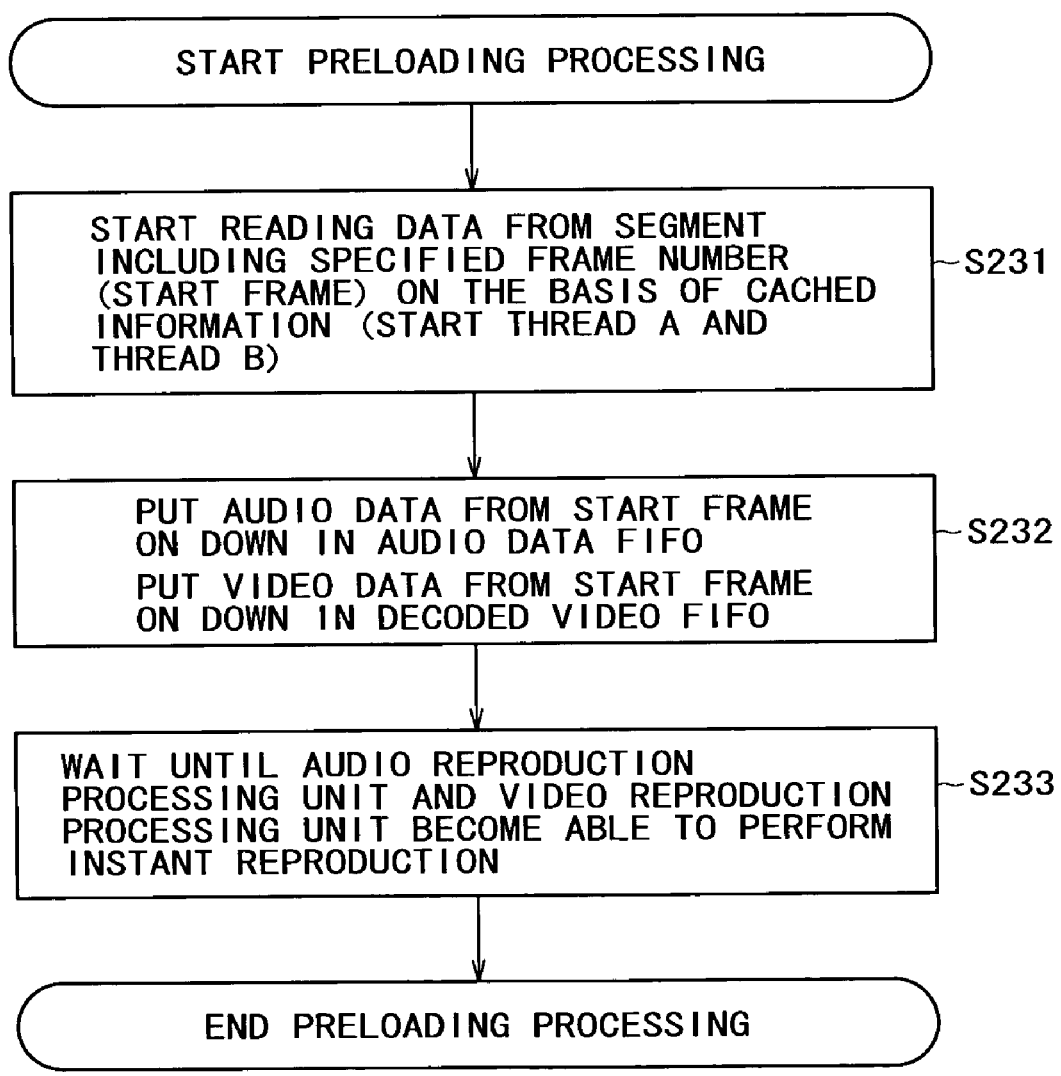

DATA PROCESSING APPARATUS, DATA PROCESSING METHOD, INFORMATION STORING MEDIUM, AND COMPUTER PROGRAM

CROSS-REFERENCE TO RELATED APPLICATIONS

The present application claims priority from Japanese Application No. 2002-303068 filed Oct. 17, 2002, the disclosure of which is hereby incorporated by reference herein.

BACKGROUND OF THE INVENTION

The present invention relates to a data processing apparatus, a data processing method, an information storing medium, and a computer program, and particularly to a data processing apparatus and a data processing method for performing a process of decoding data compressed by, for example, MPEG2 (Motion Pictures Experts Group 2) or the like, and outputting video data based on the decoded data and audio data via a display and a speaker, an information storing medium configured to store data in a format suitable for the processing, and a computer program.

Large-capacity data storage devices such as hard discs, optical discs, flash memories, and the like have spread recently. A system has been provided that is capable of random reproduction of video data stored in these storage devices and interactive reproduction processing such as, for example, selecting, extracting, and reproducing video data desired by a user on the basis of a command.

In a reproducing apparatus using, for example, a DVD (Digital Versatile Disc) or the like, video data is divided and set as data in predetermined units. The reproducing apparatus is configured to perform a process in which a user performs an operation, such as a program search, a jump, or the like as required, and only scenes desired to be viewed are reproduced.

Moving image data to be stored on a storing medium, such as a hard disc, an optical disc, a flash memory, or the like, is generally stored after reducing the amount of data by a coding (compression) process. Also, in many cases, data to be transmitted via a network such as the Internet is transmitted after reducing the amount of data by a coding (compression) process, the coded data is stored on a storing medium on a receiving side, and a decoding (decompression) process is performed at the time of reproduction.

Among the best known methods for video compression processing is MPEG (Motion Pictures Experts Group) compression technology. An MPEG stream generated by MPEG compression is stored on a recording medium, such as a DVD or the like, or stored in IP packets in accordance with IP (Internet Protocol) and then transferred on the Internet, whereby data transfer efficiency and data storage efficiency are improved.

MPEG is a technology for realizing high-quality video compression processing. The compression method of MPEG2, which is currently used most often, is a combination of a Discrete Cosine Transform (DCT) as compression using the correlation within a screen, motion compensation as compression based on the correlation between screens, and Huffman coding as compression based on the correlation between code strings. In MPEG2, for predictive coding using motion compensation, a GOP (Group Of Pictures) structure as a group including a plurality of frames formed by three kinds of elements referred to as an I-picture, a P-picture, and a B-picture is employed.

In reproducing frame data including such a group, decoding processing in units of group data, that is, a GOP, is required. Hence, to perform a process such as a program search, a jump, or the like smoothly using a storing medium storing MPEG compressed video data requires a configuration in which decoding processing in GOP units is taken into consideration.

Compressed data to be recorded on a disc or the like is divided into segment units in consideration of decoding processing in the GOP units, and is then stored. At the time of decoding and reproduction, decoding in segment units is performed, and then a reproduction process is performed.

As a conventional technique disclosed for decoding and reproduction processing of compressed data recorded on a disc or the like, there is, for example, a technique in which address data allowing chapter reproduction is recorded in a moving picture user file defined by an MPEG standard and the data is read to reproduce a chapter, thereby enabling the reading of moving pictures from a predetermined position (see Patent Literature 1, for example). Also, a configuration is proposed in which an ID is given to each certain set of data to enable reproduction (random access) and reverse reproduction from a position desired by a user, and a skip search (see Patent Literature 2, for example). Further, a configuration is proposed in which a decoding process is performed on the basis of coded data, one screen is divided on the basis of the decoded data to display a plurality of images, and one selected image is set in a reproduction enable state, thereby making it possible to quickly go over a list of recorded moving images to facilitate program searching (see Patent Literature 3, for example).

[Patent Literature 1]
  Japanese Patent Laid-open No. Hei 7-236116

[Patent Literature 2]
  Japanese Patent Laid-open No. Hei 8-273296

[Patent Literature 3]
  Japanese Patent Laid-open No. Hei 10-145743

In the case where segmented compressed video data of a plurality of contents is stored on a storing medium such as a DVD, or the like, for example, and content change processing, program search processing, jump processing or the like is performed, index information of a content stored on the disc is read in response to a specifying command received from a user, and a search is made for the specified content. Further, a search is made for a segment where a user-specified frame is present, and then the segment extracted is decoded and reproduced. Thus, there is a problem of a long processing time such as the seek time required for a head to move from a position for reading the index information of the disc to a position where the segment to be read is stored when content change processing, program search processing, jump processing, or the like is performed.

A system has recently been devised that stores multiple-viewpoint image data on a disc and changes the viewpoint freely on the basis of a user specification. For example, a system has been devised in which images of a subject taken from a plurality of viewpoint positions or sight line directions are stored on a storing medium, such as a DVD, a CD, or the like, and when a stored image is displayed on a CRT, a liquid crystal display device, or the like, the user freely moves the viewpoint to a position by operating a controller and observes the image of the subject. In such a system, the long time taken to change images when the user selects and displays different viewpoint images one after another causes a delay between the selection and the displayed images, so that good interactive reproduction is not maintained.

Because video from a plurality of viewpoints is required for video contents, the amount of information to be recorded is increased. It is therefore essential that the video be stored as data compressed by MPEG2 or the like. Thus, while a data decoding process is essential, the interruption of video or audio must be avoided as much as possible when a viewer changes images from a plurality of angles.

SUMMARY OF THE INVENTION

The present invention has been made in view of the above problems, and it is accordingly an object of the present invention to provide a data processing apparatus and a data processing method that shorten the processing time when a content change process, a program search process, a jump process, or the like is performed in reading and reproducing data from an information storing medium, such as a DVD, a CD, or the like storing data coded (compressed) by MPEG2 or the like, and which thereby enable smooth video change; an information storing medium configured to store data in a format suitable for the processing; and a computer program.

Whereas the method described in the above Patent Literature 1 is specialized in chapter search reproduction, the present invention provides a configuration enabling searches for frame number units. In addition, while the method described in Patent Literature 1 uses a text file defined by the MPEG standard, the configuration of the present invention has the advantage of eliminating the need for conforming to such a standard (platform).

Further, the method described in the above Patent Literature 2 manages data sets by ID and realizes a program search by providing correspondence between the ID and sector numbers on a medium and can therefore realize only searches for data set units. On the other hand, the configuration of the present invention realizes a program search by providing correspondence between the first frame number in a data segment and the relative address in the data segment and therefore enables searches for frame number units.

Further, the method described in the above Patent Literature 3 uses image thumbnail information as an index for program searches and therefore allows program searches only when the index is used. On the other hand, the configuration of the present invention has the advantage of enabling searches for frame number units.

Thus, the present invention provides a configuration not disclosed in the conventional techniques and provides an apparatus and a method that shorten the processing time when a content change process, a program search process, a jump process, or the like is performed in reading and reproducing data from an information storing medium, such as a DVD, a CD, or the like storing data coded (compressed) by MPEG2 or the like, and which thereby enable smooth video change.

According to a first aspect of the present invention, there is provided a data processing apparatus for decoding and reproducing coded data. The apparatus includes a cache unit operable to store cached information including a physical start address of each content stored on an information storing medium and additional information corresponding to each content; a FIFO control unit operable to obtain from the cache unit additional information corresponding to a content to be reproduced, and to set storage areas for an audio data FIFO, a video data FIFO, and a decoded video data FIFO on the basis of the additional information corresponding to the content to be reproduced; and a data processing unit operable to obtain data from a data segment including data to be reproduced according to the physical start address of the content to be reproduced and the additional information corresponding to the content to be reproduced, to store one portion of the data in the audio data FIFO and another portion of the data in the video data FIFO, to obtain the another portion of the data from the video data FIFO, to decode the obtained data, to store the decoded data in the decoded video data FIFO, and to reproduce the one portion of the data stored in the audio data FIFO and the decoded data stored in the decoded video data FIFO.

Further, in an embodiment of the data processing apparatus according to the present invention, the additional information corresponding to each content stored by the cache unit includes header information and segment information for a corresponding content, the corresponding content having a plurality of data segments. The header information includes a horizontal video size, a vertical video size, a video depth, a maximum video data size in the plurality of data segments, and a maximum audio data size in the plurality of data segments for the corresponding content. The segment information includes a first frame number for each of the plurality of data segments, a number of frames in each of the plurality of data segments, and an address of delimiter information corresponding to each of the plurality of data segments relative to a start of data. The FIFO control unit calculates maximum FIFO storage areas required for decoding and reproducing the content to be reproduced on the basis of information specifying the content to be reproduced and the additional information corresponding to the content to be reproduced, and sets the storage areas for the audio data FIFO, the video data FIFO, and the decoded video data FIFO.

Further, in an embodiment of the data processing apparatus according to the present invention, the FIFO control unit calculates a size of the storage area for the video data FIFO in bytes according to (maximum video data size×P), and calculates a size of the storage area for the audio data FIFO in bytes according to (maximum audio data size×P), where P is a number of segments to be stored in the video data FIFO and the audio data FIFO, and the maximum video data size and the maximum audio data size are obtained from the cached information stored in the cache unit.

Further, in an embodiment of the data processing apparatus according to the present invention, the FIFO control unit calculates a size of the storage area for the decoded video data FIFO in bytes according to (horizontal video size×vertical video size×video depth×p), where p is a number of frames to be stored in the decoded video data FIFO, and the horizontal video size, the vertical video size and the video depth are obtained from the cached information stored in the cache unit.

Further, in an embodiment of the data processing apparatus according to the present invention, the data processing unit processes a first thread which reads a data segment including frame data to be reproduced from the information storing medium, divides data stored in the data segment into audio data and video data, stores the audio data in the audio data FIFO, and stores the video data in the video data FIFO; and a second thread which decodes the video data stored in the video data FIFO and stores the decoded video data from a frame specified for reproduction in the decoded video data FIFO.

Further, in an embodiment of the data processing apparatus according to the present invention, the data processing unit includes an audio reproduction processing unit operable to perform reproduction processing on the basis of the audio data stored in the audio data FIFO; and a video reproduction processing unit operable to perform reproduction processing on the basis of the decoded video data stored in the decoded video data FIFO.

Further, according to a second aspect of the present invention, there is provided an information storing medium storing data for reproducing a content. The data includes a plurality of data segments forming the content; the header information corresponding to the content; segment information corresponding to the content; and delimiter information corresponding to each data segment; the header information including a horizontal video size, a vertical video size, a video depth, a maximum video data size of the plurality of data segments, and a maximum audio data size of the plurality of data segments; and the segment information including a first frame number for each of the plurality of data segments, a number of frames in each of the plurality of data segments, and an address of delimiter information corresponding to each of the plurality of data segments relative to a start of data.

Further, in an embodiment of the information storing medium according to the present invention, the delimiter information includes a first frame number within a data segment, a number of frames within the data segment, a video data size within the data segment, and an audio data size within the data segment.

Further, according to a third aspect of the present invention, there is provided a data processing method for decoding and reproducing coded data. The method includes storing cache information including a physical start address of each content stored on an information storing medium and additional information corresponding to each content; obtaining additional information corresponding to a content to be reproduced, and setting storage areas for an audio data FIFO, a video data FIFO, and a decoded video data FIFO on the basis of the additional information corresponding to the content to be reproduced; and performing a data processing process including obtaining data from a data segment including data to be reproduced according to the physical start address of the content to be reproduced and the additional information corresponding to the content to be reproduced, storing one portion of the data in the audio data FIFO and another portion of the data in the video data FIFO, obtaining the another portion of the data from the video data FIFO, decoding the obtained data, storing the decoded data in the decoded video data FIFO, and reproducing the one portion of the data stored in the audio data FIFO and the decoded data stored in the decoded video data FIFO.

Further, in an embodiment of the data processing method according to the present invention, the additional information corresponding to each content includes header information and segment information for a corresponding content, the corresponding content having a plurality of data segments. The header information includes a horizontal video size, a vertical video size, a video depth, a maximum video data size in the plurality of data segments, and a maximum audio data size in the plurality of data segments. The segment information includes a first frame number for each of the plurality of data segments, a number of frames in each of the plurality of data segments, and an address of delimiter information corresponding to each of the plurality of data segments relative to a start of data. The method further includes calculating maximum FIFO storage areas required for decoding and reproducing the content to be reproduced on the basis of information specifying the content to be reproduced and the additional information corresponding to the content to be reproduced, and setting the storage areas for the audio data FIFO, the video data FIFO, and the decoded video data FIFO.

Further, in an embodiment of the data processing method according to the present invention, the calculating step includes calculating a size of the storage area for the video data FIFO in bytes according to (maximum video data size×P) and calculating a size of the storage area for the audio data FIFO in bytes according to (maximum audio data size×P), where P is a number of segments to be stored in the video data FIFO and the audio data FIFO, and the maximum video data size and the maximum audio data size are obtained from the cached information stored in the storing step.

Further, in an embodiment of the data processing method according to the present invention, the calculating step includes calculating a size of the storage area for the decoded video data FIFO in bytes according to (horizontal video size×vertical video size×video depth×p), where p is a number of frames to be stored in the decoded video data FIFO, and the horizontal video size, the vertical video size and the video depth are obtained from the cached information stored in the storing step.

Further, in an embodiment of the data processing method according to the present invention, the data processing process further includes performing a first thread including reading a data segment including frame data to be reproduced from the information storing medium, dividing data stored in the data segment into audio data and video data, storing the audio data in the audio data FIFO and storing the video data in the video data FIFO; and performing a second thread including decoding the video data stored in the video data FIFO and storing the decoded video data from a frame specified for reproduction in the decoded video data FIFO.

Further, according to a fourth aspect of the present invention, there is provided a recording medium recorded with a computer program for decoding and reproducing coded data. The program includes storing cache information including a physical start address of each content stored on an information storing medium and additional information corresponding to each content; obtaining additional information corresponding to a content to be reproduced, and setting storage areas for an audio data FIFO, a video data FIFO, and a decoded video data FIFO on the basis of the additional information corresponding to the content to be reproduced; and performing a data processing process including obtaining data from a data segment including data to be reproduced according to the physical start address of the content to be reproduced and the additional information corresponding to the content to be reproduced, storing one portion of the data in the audio data FIFO and another portion of the data in the video data FIFO, obtaining the another portion of the data from the video data FIFO, decoding the obtained data, storing the decoded data in the decoded video data FIFO, and reproducing the one portion of the data stored in the audio data FIFO and the decoded data stored in the decoded video data FIFO.

With the configuration according to the present invention, a physical start address of each content stored on an information storing medium, such as a DVD, a CD, or the like, and header information and segment information as additional information corresponding to each content, are stored in a cache unit. Maximum FIFO areas required for decoding and reproducing a content are calculated on the basis of information on the content specified for reproduction and the cached information, and storage areas for an audio data FIFO, a video data FIFO, and a decoded video data FIFO are set. Therefore, a necessary and sufficient area for each of the FIFOs is set efficiently, and the content can be reproduced without memory shortage or the like in reproduction processing. Also, in processing for a content change, a program search, a jump, or the like, FIFO areas of the proper size can be set dynamically on the basis of the cached information, and thus a smooth reproduced data change can be made when the content change, program search, jump, or the like is performed.

Further, the configuration according to the present invention includes a first thread for reading a data segment including frame data to be reproduced from the information storing medium, dividing data stored in the data segment into audio data and video data, storing the audio data in the audio data FIFO, and storing the video data in the video data FIFO; a second thread for decoding the video data stored in the video data FIFO and storing the decoded video data from a frame specified for reproduction in the decoded video data FIFO; an audio reproduction processing unit operable to perform reproduction processing on the basis of the audio data stored in the audio data FIFO; and a video reproduction processing unit operable to perform reproduction processing on the basis of the decoded video data stored in the decoded video data FIFO. Each processing unit stores data in the FIFOs or processes the FIFO stored data. Therefore, processing making the most of the processing speed of each processing thread or processing unit can be performed. Thus, efficient processing can be performed.

Further, with the configuration according to the present invention, an information storing medium storing data for reproducing a content stores data including a plurality of data segments forming the content, a horizontal video size, a vertical video size, a video depth, a maximum video data size of the plurality of data segments, and a maximum audio data size of the plurality of data segments as header information corresponding to the content. The information storing medium also stores a first frame number for each of the plurality of data segments, a number of frames in each of the plurality of data segments, and an address of delimiter information corresponding to each of the plurality of data segments relative to a start of data as segment information. Therefore, a data reproduction processing apparatus can cache these pieces of information and quickly perform FIFO setting and data reading using the cached information. The data reproduction processing apparatus can thus perform efficient data decoding and reproducing processing.

Incidentally, the computer program according to the present invention can be provided by a storing medium such as, for example, a CD, an FD, or an MO, or a communication medium such as a network. The medium is provided in a computer readable form to a general purpose computer system capable of executing various program codes, for example. By providing such a program in a computer readable form, processing in accordance with the program is realized on a computer system.

Other and further objects, features, and advantages of the present invention will be apparent from the following more detailed description of embodiments of the present invention with reference to the accompanying drawings. It is to be noted that in the present specification, a system refers to a logical set configuration of a plurality of apparatus, and that the apparatus of the configuration are not necessarily present within the same casing.

BRIEF DESCRIPTION OF THE DRAWINGS

These and other objects of the invention will be seen by reference to the description, taken in connection with the accompanying drawings, in which:

FIG. 4 is a diagram showing the data format of a content according to the present invention;

FIGS. 5A and 5B are diagrams of assistance in explaining header information and segment information in the data format of the content according to the present invention;

FIGS. 6A and 6B are diagrams of assistance in explaining delimiter information and data segment information in the data format of the content according to the present invention;

FIG. 7 is a block diagram showing a functional configuration of the data processing apparatus according to the present invention;

FIG. 11 is a flowchart of assistance in explaining a preloading process in the content reproduction process according to the present invention;

DETAILED DESCRIPTION OF PREFERRED EMBODIMENTS

A data processing apparatus, a data processing method, an information storing medium, and a computer program according to the present invention will hereinafter be described in detail with reference to the drawings.

[Outline of Data Processing Apparatus]

Figure 1:
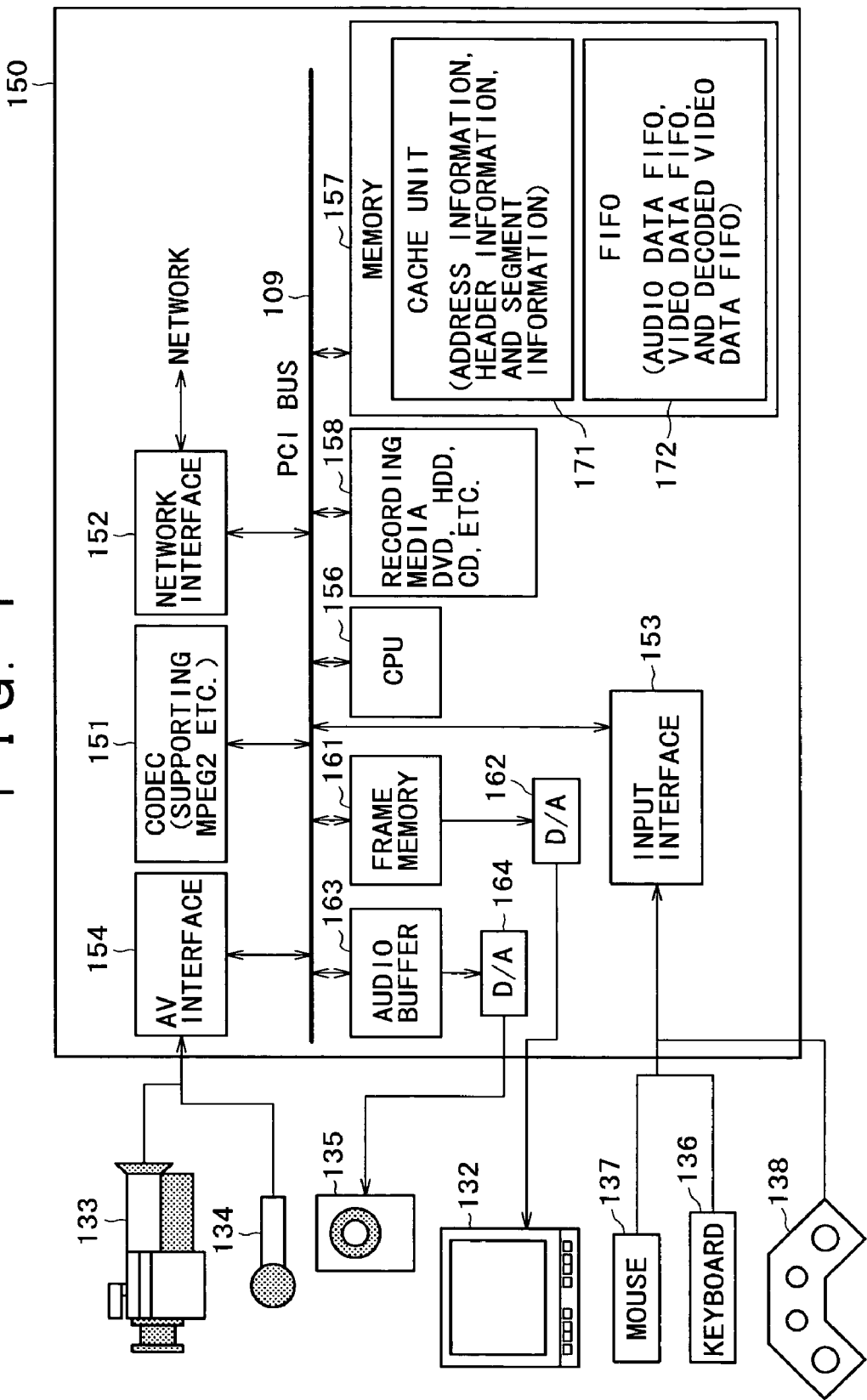
FIG. 1 is a diagram showing a configuration of a data processing apparatus according to the present invention.

FIG. 1 is a block diagram showing an embodiment of a data processing apparatus according to the present invention. The data processing apparatus in the present embodiment reproduces compressed video data stored on a recording medium, such as a DVD, a CD, or the like, or stores compressed video data distributed via a data communication network, such as the Internet or the like, on a writable storing medium, such as a DVD, a CD, a hard disc, or the like, and reproduces the compressed video data.

Data to be reproduced by a system according to the present invention is compressed coded data and is reproduced on a display after being decoded. Hence, the data processing apparatus 150 shown in FIG. 1 has a codec 151 for performing decode processing. Incidentally, the configuration example shown in FIG. 1 is configured to code data input from AV data input devices, such as a video camera 133, a microphone 134, and the like, by means of the codec 151, and is configured to write the coded data generated by the codec 151 to a DVD, a CD, a hard disc, or the like.

The configuration of the data processing apparatus 150 shown in FIG. 1 will be described. A CPU (Central Processing Unit) 156 is a processor for executing various application programs and an OS (Operating System). As will be described later in detail, the CPU in the system according to the present invention functions as control means for controlling display processing or determining data to be read from storing means when a viewpoint change command input from a controller or the like is detected.

A memory 157 includes a ROM (Read-Only Memory), a RAM (Random Access Memory), and the like. The memory 157 is used as a work area and a storage area for storing fixed data as a program to be executed by the CPU 156 or operating parameters, a program executed in processing by the CPU 156, and parameters changed as appropriate in program processing.

As will be described later in detail, the memory 157 is used as a cache unit 171 for storing information on a start address on a disc, header information, and segment information of a compressed video content recorded on the disc, such as a DVD or the like, and as a FIFO area 172 of FIFOs for audio data and video data stored on the disc and a FIFO for decoded video data. The FIFO area is set dynamically, and the size or the like of the FIFO is determined dynamically on the basis of cached information. Processing using these arrangements will be described later in detail.

Recording media 158 are DVDs, hard discs, CDs, and the like. The recording media 158 store coded data, such as video contents, multiple-viewpoint video, and the like, to be reproduced.

The data processing apparatus 150 further includes a network interface 152 functioning as an interface with a communication network. The data processing apparatus 150 receives coded data compressed by MPEG2 or the like via the network and stores the received data on the recording media 158. Alternatively, the data processing apparatus 150 receives non-coded data, codes the received data by means of the codec 151, and then stores the coded data on the recording media 158.

A data processing command from a user or a command for a content change, a program search, a jump, a viewpoint change, or the like for video data displayed on a display 132 is input via an input interface 153 from various input devices, including a mouse 137, a keyboard 136, and a controller 138. Data input via an AV interface 154 from AV data input devices, such as a video camera 133, a microphone 134, and the like, is coded by the codec 151 (by, for example, MPEG2) and then stored on the recording media 158.

The coded data stored on the recording media 158 is stored in the video data FIFO formed in the memory 157. After decoding by the codec 151, the decoded image is stored in the decoded video data FIFO. Thereafter, the image is stored in a frame memory 161 in a frame unit, converted via a D/A converter 162, and then displayed on the display 132. In the meantime, audio data is stored in the audio data FIFO formed in the memory 157, decoded by the codec 151, and then stored in an audio buffer 163. Thereafter, the audio data is converted via the D/A converter 164, and then output at a speaker 135.

Figure 2:
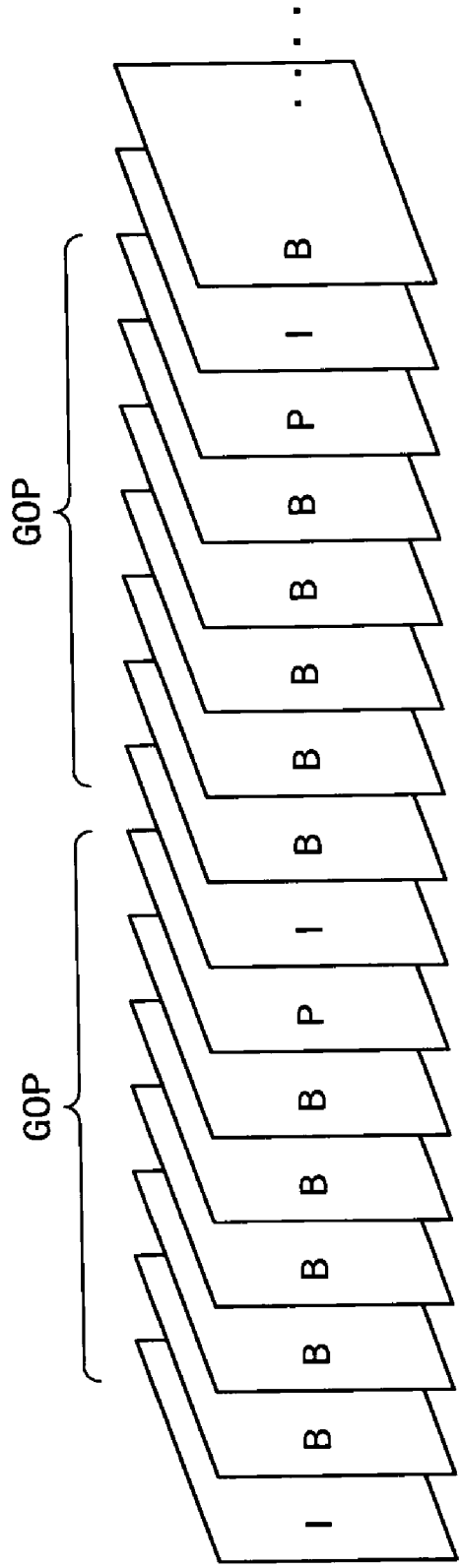
FIG. 2 is a diagram of assistance in explaining the structure of MPEG video data.

Data to be subjected to a reproduction process by the data processing apparatus 150 according to the present embodiment is compressed data, for example, image data compressed by MPEG2, which is known as a technology for realizing high-quality image compression processing. The compression method of MPEG2 is a combination of a Discrete Cosine Transform (DCT) as compression using the correlation within a screen, motion compensation as compression based on the correlation between screens, and Huffman coding as compression based on the correlation between code strings. In MPEG2, for predictive coding using motion compensation, as shown in FIG. 2, image frames forming a moving image are classified into three kinds of elements referred to as I-pictures, P-pictures, and B-pictures, and a GOP (Group Of Pictures) structure as a group forming frames of I-pictures, P-pictures, and B-pictures in a predetermined unit is employed.

An I-picture (Intra coded picture) is picture frame data created by intra-field coding without predictive coding from a previous picture. If only pictures created using predictive coding are arranged, it is not possible to present a screen instantly in response to random access. Accordingly, a reference for access is created periodically to deal with random access. The I-picture exists to maintain the independence of a GOP, so to speak.

As for the frequency of occurrence of I-pictures, which depends on the random access performance required for each application, I-pictures generally appear at a ratio of one to 15 pictures, with one picture for one field (two for one frame). The amount of data of one I-picture corresponds to two to three times that of one P-picture and five to six times that of one B-picture. A GOP is a group of pictures from one I-picture to the next I-picture. Hence, image prediction is performed between pictures within the group.

A P-picture (Predictive coded picture) is created by predictive coding from a previous picture and is created on the basis of an I-picture. Whereas the I-picture is an "intra-frame coded picture," the P-picture is defined as an "inter-frame forward direction predictive coded picture."

A B-picture (Bidirectionally predictive coded picture) is a "bidirectionally predictive coded picture." The B-picture is created by predictive coding from two I-pictures or P-pictures preceding and succeeding the B-picture.

Figure 3:
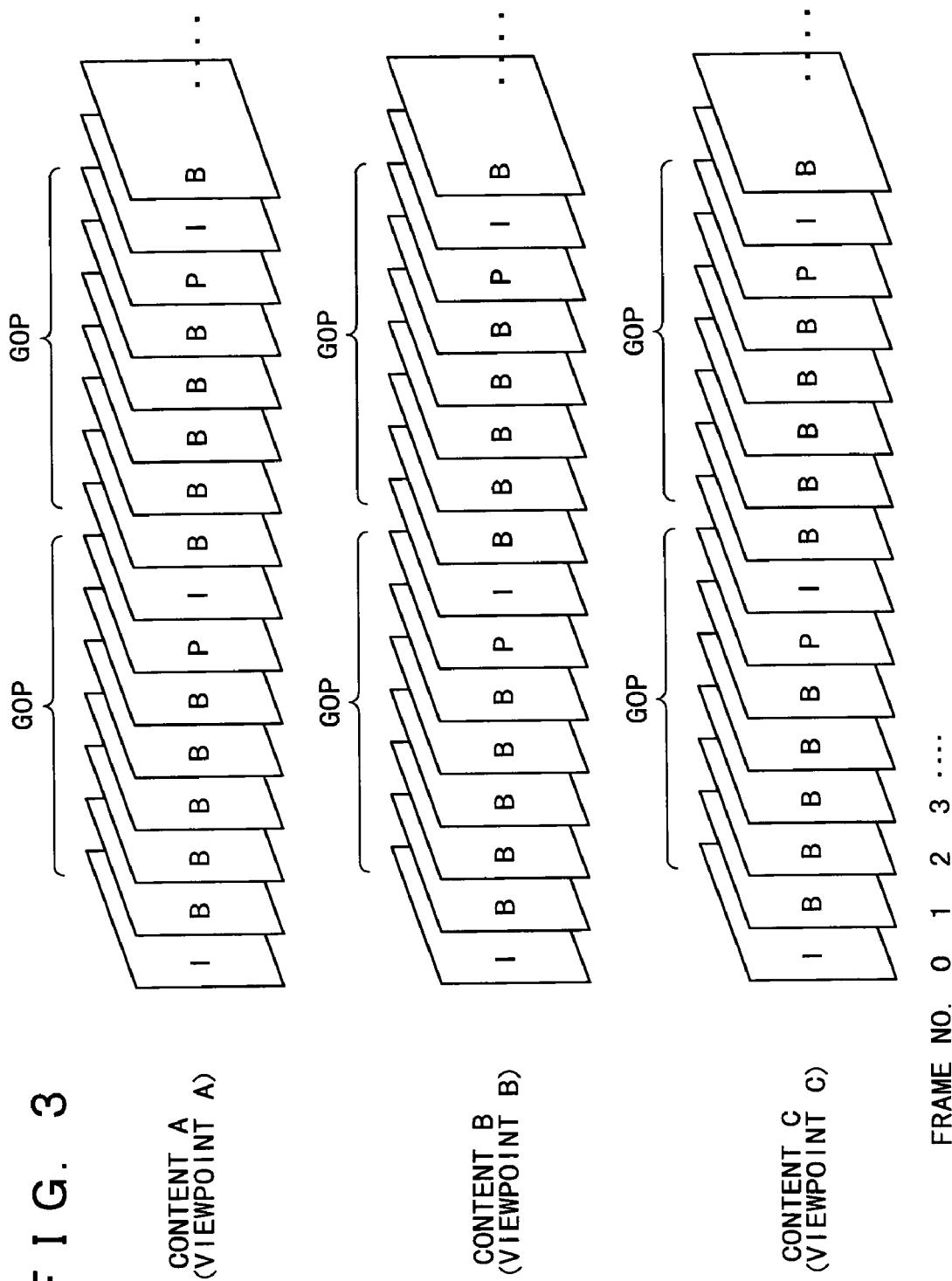
FIG. 3 is a diagram of assistance in explaining the structure of MPEG video data in video having a plurality of contents.

The data processing apparatus according to the present invention is configured to decode and reproduce MPEG compressed data. Thus, when a plurality of contents or multiple-viewpoint images are stored as MPEG compressed images on a storing medium, such as a DVD or the like, as shown, for example, in FIG. 3, three different contents A to C or viewpoint images (viewpoints A to C) are stored as MPEG compressed data. In reproduction, the data is read from the recording medium according to user-specified viewpoint information, decoding processing is performed, and then the decoded data is reproduced.

A compression method such as MPEG requires a temporally continuous image block, that is, a GOP unit as a frame group including a plurality of frames as described above to be read and decoded together. Therefore, data reading and decoding processing are performed in GOP units. Hence, when a change to each content or viewpoint is made at a frame break in GOP units, viewpoint change processing can be performed relatively smoothly. However, when a viewpoint change is to be made at a frame other than a frame break in GOP units, an interruption of the image display tends to occur due to a problem in processing time.

[Data Format]

In order to enable data output without interruption in processing for these content changes, program searches, jumps, and the like, the present invention proposes a conventionally nonexistent data format. The format of compressed data according to the present invention will be described with reference to FIG. 4.

The data structure shown in FIG. 4 represents the data format of one content. When a plurality of contents are stored on a storing medium, such as a DVD or the like, for example, the plurality of contents, each having the data format shown in FIG. 4, are stored in a data storing area of the disc.

As shown in FIG. 4, the data format according to the present invention includes header information, segment information, and a plurality of delimiters and data segments. The example of FIG. 4 has delimiters 0 to N and data segments 0 to N, where the value of N is an arbitrary integral value that depends on the content.

Details of each piece of information will be described with reference to FIGS. 5A and 5B and FIGS. 6A and 6B. A description will first be made of header information with reference to FIG. 5A and segment information with reference to FIG. 5B.

The header information has the following information:
(h1) int width: horizontal video size
(h2) int height: vertical video size
(h3) int depth: video depth
(h4) int max MovieSize: largest movie (video) data size in the data segments
(h5) int max AudioSize: largest audio data size in the data segments The (h1) horizontal video size and the (h2) vertical video size are represented as pixel sizes, for example. The (h3) video depth is information on the number of bits set per pixel. For example, in the case of an RGB image, when an 8-bit value is set for each of R, G, and B, information of 24 bits/pixel is stored. The (h4) data size and the (h5) data size are the size (bytes) of video data having the largest amount of information (number of bytes) in the segments 0 to N in the format shown in FIG. 4, and the size (bytes) of audio data having the largest amount of information (number of bytes) in the segments 0 to N. When the video data is RGB data, for example, information on the total data size of the RGB data is stored.

The segment information has the following information:
(s1) int frameNumber: the first frame number within a data segment
(s2) int frameNums: the number of frames within the data segment
(s3) int addr: the address of a delimiter relative to the start of data The (s1) first frame number within a data segment is the number of the first frame of the frames stored in each of the plurality of segments 0 to N shown in FIG. 4. A plurality of image frames are stored in each segment, and the first frame number within each segment is retained as segment information. The (s2) number of frames is the number of image frames stored in each of the segments 0 to N. The (s3) address of a delimiter relative to the start of data is the address of each of the delimiters 0 to N relative to the start of the format shown in FIG. 4 (start of the header portion) and is information on a storage position of the delimiter.

A description will next be made of the delimiter information of FIG. 6A and the data segment information of FIG. 6B.

Each of the delimiters 0 to N has the following information:
(d1) int frameNumber: the first frame number within a data segment (d2) int frameNums: the number of frames within the data segment
(d3) int movieSize: the movie (video) data size within the data segment
(d4) int audioSize: the audio data size within the data segment As is understood from the format shown in FIG. 4, the delimiters are information for individual data segments. The information is set in correspondence with the data segments 0 to N included in the content. The information of the delimiters 0 to N corresponds to the respective segment data 0 to N.

The first frame number within each segment, the number of frames stored within each segment, the video data size (number of bytes), and the audio data size (number of bytes) included in the segment are each stored as delimiter information.

Each of the data segments 0 to N has the following information:
(DS1) movie (video) data (of a size indicated by the delimiter)
(DS2) audio data (of a size indicated by the delimiter)

The data segments each need to be formed by frame information and the like that enable decode processing to be performed within a single segment. That is, each piece of data needs to be closed within the segment. For example, the movie (video) data forms MPEG2 Closed GOP 15 frames or the like, and the audio data forms straight PCM 48 kHz 24024 samples or the like. Each piece of data is formed so as to enable decoding by processing of only one segment without using information of another segment. As described above, each segment stores video data and audio data of sizes (numbers of bytes) recorded in the corresponding delimiter.

[Details of Data Reproduction Processing]

A description will next be made of the details of processing to reproduce a content having the above-described data format.

FIG. 7 is a block diagram of the functions of a data processing unit for performing a reproduction process and the configuration of a data storing unit. Incidentally, the processing of the data processing unit 310 shown in FIG. 7 is specifically performed mainly by the CPU and the codec in the data processing apparatus shown in FIG. 1. The data storing unit 320 shown in FIG. 7 corresponds to the memory 157 in FIG. 1.

The data processing unit 310 has a thread A 312 and a thread B 313 as a processing unit. The thread A 312 reads data from a storing medium such as a DVD or the like and divides the data into audio data and video data. The thread A receives from a cache unit 322 of the data storing unit 320 a physical start address indicating the start position of a stored content to be reproduced, and header information and segment information of the content to be reproduced. The physical start address, the header information, and the segment information are stored in the cache unit 322. The thread A divides and extracts video data and audio data stored in the data segment portions to be reproduced. The thread A stores the audio data in an audio data FIFO 321 formed in the data storing unit 320 and stores the video data in a video data FIFO 323.

The thread B decodes the video data, for example MPEG2 compressed data, after reading the data from the video data FIFO 323, and then stores the decoded data in a decoded video data FIFO 324. The processing of the thread A and the thread B can be performed in parallel. A FIFO control unit 315 receives the header information and the segment information of the content to be reproduced from the cache unit 322, dynamically sets the video data FIFO 323, the audio data FIFO 321, and the decoded video FIFO 324 in the data storing unit 320, and frees the set FIFOs. A video reproduction processing unit 314 and an audio reproduction processing unit 311 output video data and audio data, respectively, corresponding to a frame specified from an input unit 331 for reproduction to a video display unit 333 and an audio output unit 332, respectively. These processes are also performed in parallel with the processes of the thread units.

In starting content reproduction, a physical start address of a content stored on a storing medium, segment information of each content, and header information of each content are all cached from the storing medium into the cache unit 322 of the data storing unit 320. When a plurality of contents are stored on the disc, these pieces of information for all the contents are stored in the cache unit 322.

As described above, the header information includes:
(h1) int width: horizontal video size
(h2) int height: vertical video size
(h3) int depth: video depth
(h4) int max MovieSize: largest movie (video) data size in the data segments
(h5) int max AudioSize: largest audio data size in the data segments As described above, the segment information includes:
(s1) int frameNumber: the first frame number within a data segment
(s2) int frameNums: the number of frames within the data segment
(s3) int addr: the address of a delimiter relative to the start of data These pieces of information of each content are all stored in the cache unit 322.

The data of the audio data FIFO 321 and the video data FIFO 323 is managed in segment units. Hence, when a memory area for P segments is to be secured for a FIFO, for example, the FIFO control unit 315 sets the video data FIFO 323 and the audio data FIFO 321 so as to secure memory areas of sizes calculated by the following expressions, respectively.

[Expression 1]

(Maximum video data size×P)[bytes]

(Maximum audio data size×P)[bytes]     (Expression 1)

The maximum video data size and the maximum audio data size in the above (Expression 1) are all described in the cached header information. Thus, the video data FIFO 323 and the audio data FIFO 321 required can be secured quickly in response to the specification of a content or a frame to be reproduced.

When the decoded video FIFO 324 for p frames, for example, is provided, the decoded video FIFO 324 is set to secure a memory area of a size calculated by the following expression.

[Expression 2]

(Horizontal video size×vertical video size×video depth×p)[bytes]     (Expression 2)

The horizontal video size, the vertical video size, and the video depth in the above (Expression 2) are all described in the cached header information. Thus, the decoded video FIFO 324 required can be secured quickly in response to the specification of a segment to be reproduced.

The video data FIFO 323, the audio data FIFO 321, and the decoded video FIFO 324 formed in the data storing unit 320 are secured dynamically on the basis of the information cached in the cache unit 322, on the basis of information specifying the content or frame to be reproduced, and according to the required memory areas calculated on the basis of the above (Expression 1) and (Expression 2). When reproduction processing is ended, each FIFO area is freed. Thus, memory areas are used efficiently.

In reproduction processing, decoded video is supplied from the decoded video data FIFO 324 to the video reproduction processing unit 314, and then the video reproduction processing unit 314 generates target video on the basis of the supplied data. In the meantime, audio data is supplied from the audio data FIFO 321 to the audio reproduction processing unit 311, and then the audio reproduction processing unit 311 generates reproduced audio data in synchronization with the frames reproduced by the video reproduction processing unit 314. The video data and the audio data are displayed and output via the video display unit 333, such as a CRT, an LCD, or the like, and the audio output unit 332, such as a speaker or the like, respectively.

Various commands for content selection, a program search, a jump, viewpoint direction information, and the like from a user input device are input from the input unit 331. When the input information is input to the FIFO control unit 315, the FIFO control unit 315 receives information on a data segment storing a frame to be reproduced from the cache unit 322, and sets the video data FIFO 323, the audio data FIFO 321, and the decoded video FIFO 324 on the basis of the above (Expression 1) and (Expression 2).

Next, the thread A 312 reads the data segment storing the frame to be reproduced and then stores data in the video data FIFO 323 and the audio data FIFO 321. The thread B reads the data from the video data FIFO 323, performs video decode processing, and then stores decoded video in the decoded video FIFO 324.

The video reproduction processing unit 314 receives the decoded video from the decoded video data FIFO 324, extracts the frame specified for reproduction by the input unit, and then outputs the frame to the video display unit 333. The audio reproduction processing unit 311 outputs audio data in synchronization with the reproduced frame output by the video reproduction processing unit 314 via the audio output unit 332.

As described above, a physical start address, header information, and segment information of each content are cached in the cache unit 322. It is thus possible to quickly seek to a disc position where data to be reproduced is stored in response to the input of a content or frame specified for reproduction. Further, in parallel with the seek process, FIFO memory areas for audio data and video data of read data and a FIFO memory area for decoded video can be secured through the calculation of (Expression 1) and (Expression 2) on the basis of the above-described cached information. Therefore, reading of the data and storing of the data in the FIFOs are realized in a short time, resulting in a reduction in the time required to read, decode, and reproduce the data.

Thus, changes to and reproduction of specified data can be performed rapidly in response to the specification of a content change, a program search, a jump, a viewpoint change, or the like.

Figure 8:
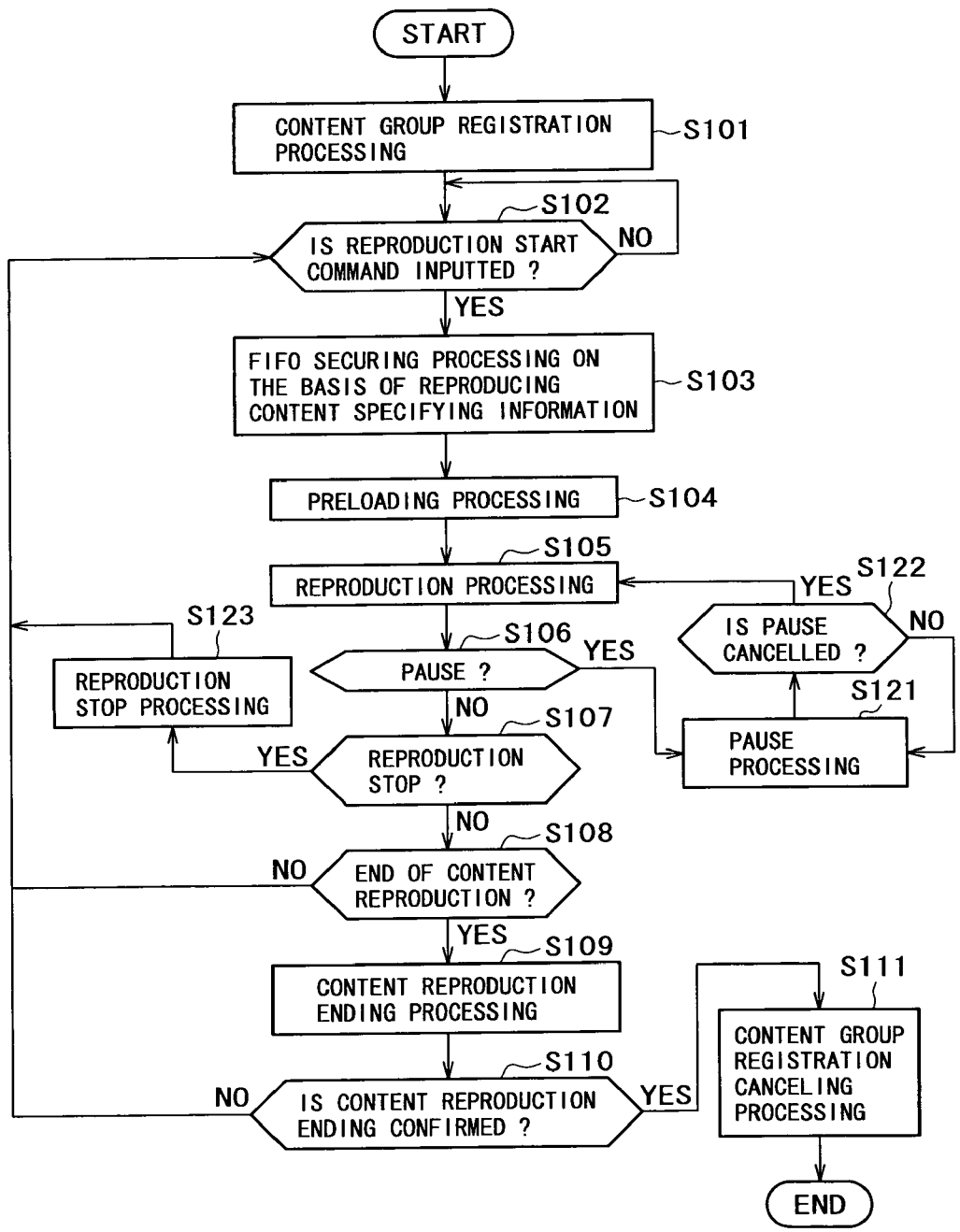
FIG. 8 is a flowchart of assistance in explaining a content reproduction process of the data processing apparatus according to the present invention.

FIG. 8 shows the general flow of a content data reproduction process. FIGS. 9 to 13 show details of the processing flows in the steps of FIG. 8. The procedure of the content data reproduction process will be described according to the processing flow of FIG. 8 with reference to the block diagram of FIG. 7.

At step S101, a content group registration processing is performed. In this process, physical start addresses of contents stored on a storing medium storing the contents, segment information of each content, and header information of each content are all cached from the storing medium into the cache unit 322 of the data storing unit 320 (see FIG. 7).

As described above, the header information includes a horizontal video size, a vertical video size, a video depth, a largest movie (video) data size in data segments, and a largest audio data size in data segments. The segment information includes a first frame number within a data segment, the number of frames within the data segment, and the address of a delimiter relative to a start of the data. These pieces of information of each content are cached.

Figure 9:
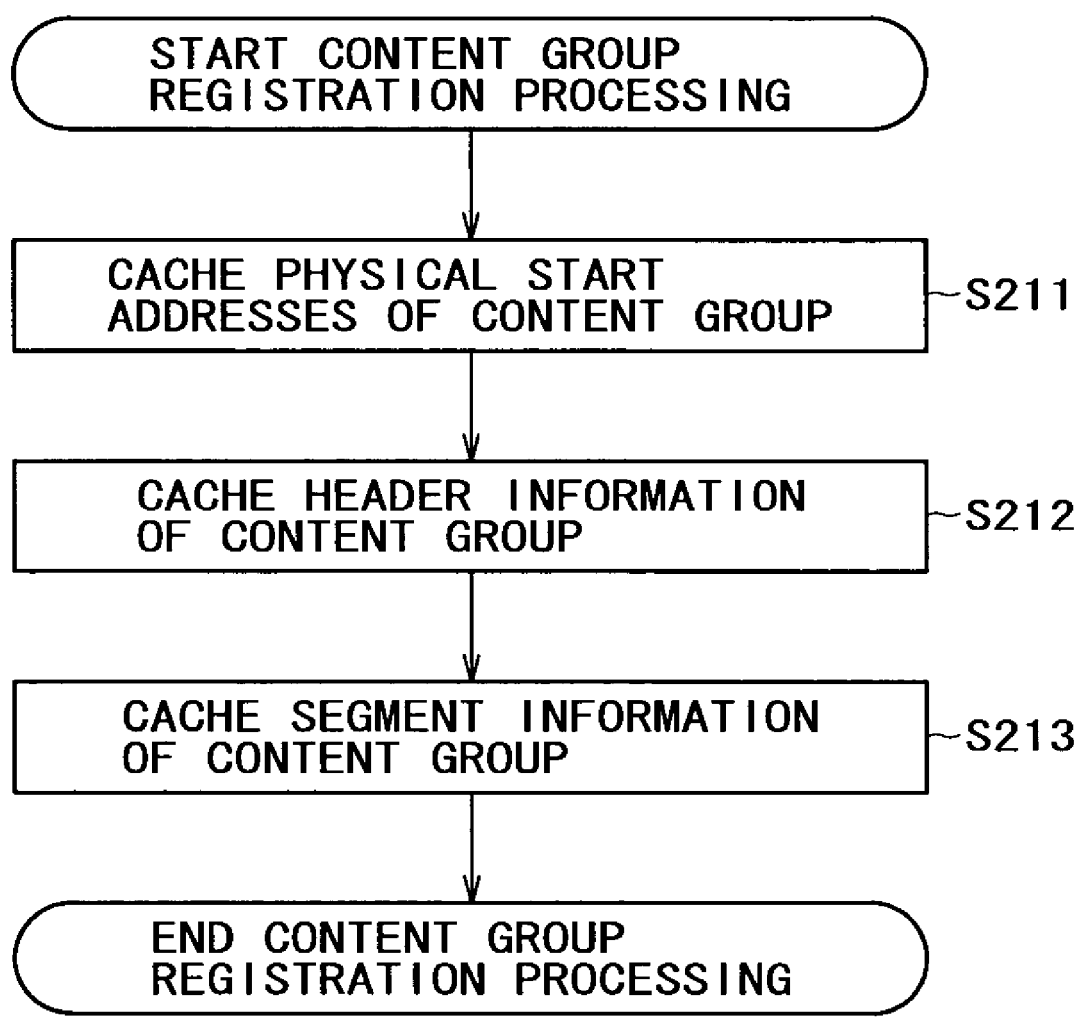
FIG. 9 is a flowchart of assistance in explaining a content group registration process in the content reproduction process according to the present invention.

Details of the content group registration process at step S101 will be described with reference to the flowchart of FIG. 9. At step S211, physical start address information of the content group is cached in the cache unit 322 (see FIG. 7) on the basis of index information or the like stored on the disc. At step S212, header information of each content is read from the disc and cached. At step S213, segment information of each content is cached.

Returning to the flowchart of FIG. 8, the description of the procedure of the content data reproduction process will be continued. At step S102, the data processing apparatus stands by until a command to reproduce a content is input from the input unit. When a reproduction command is input, the process proceeds to step S103 to perform a FIFO securing process on the basis of information for specifying a content to be reproduced.

The content reproduction command includes information for specifying a content to be reproduced or a frame to be reproduced. When a content to be reproduced is specified, it is determined that reproduction is to be performed from a first frame to be reproduced (included in a segment 0).

The FIFO securing process at step S103 secures an area for each of the video data FIFO 323, the audio data FIFO 321, and the decoded video FIFO 324 shown in FIG. 7. The areas for the audio data FIFO 321 and the video data FIFO 323 are set according to the above-described (Expression 1) on the basis of a maximum video data size and a maximum audio data size stored in the header information of the content to be reproduced. The information is stored in the cache unit 322.

The area for the decoded video FIFO 324 is set according to the above-described (Expression 2) on the basis of a horizontal video size, a vertical video size, and a video depth stored in the header information of the content to be reproduced. The information is stored in the cache unit 322.

Figure 10:
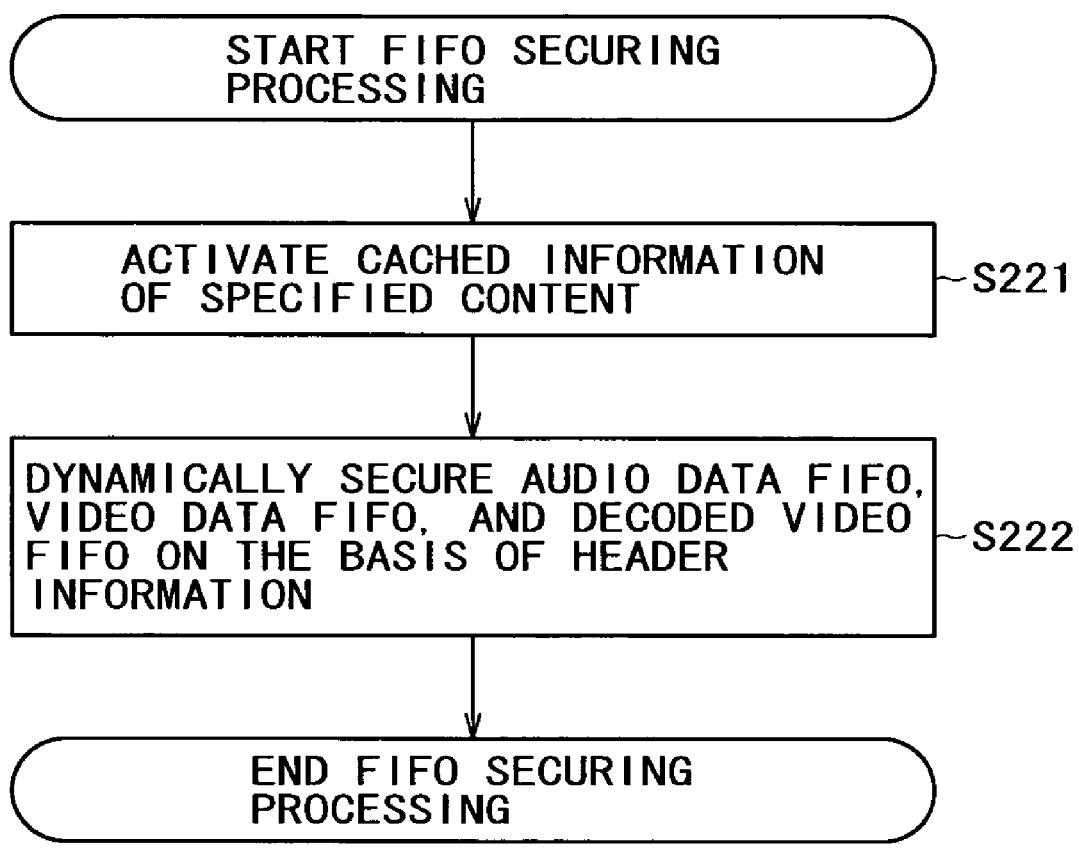
FIG. 10 is a flowchart of assistance in explaining a FIFO securing process in the content reproduction process according to the present invention.

Details of the FIFO securing process at step S103 will be described with reference to the flowchart of FIG. 10. At step S221, the cached information of the content specified for reproduction is activated, that is, read by the FIFO control unit. At the next step S222, required memory areas are calculated using (Expression 1) and (Expression 2) on the basis of the read header information, and the areas for each of the video data FIFO 323, the audio data FIFO 321, and the decoded video FIFO 324 are secured on the basis of the results of the calculations.

Returning to the flowchart of FIG. 8, the description of the procedure of the content data reproduction process will be continued. When the FIFO securing process at step S103 is completed, the process proceeds to step S104 to perform a preloading process.

Details of the preloading process will be described with reference to the flowchart of FIG. 11. At step S231, on the basis of the information on the start frame specified for reproduction by a user, a segment, which is stored in the cache unit 322 (see FIG. 7), including the start frame specified for reproduction, is determined, and then reading of data from the segment is started. At this time, the thread A 312 and the thread B 313 (see FIG. 7) are started.

The segment information is stored in the cache unit 322. The segment information includes:

(s1) int frameNumber: the first frame number within a data segment (s2) int frameNums: the number of frames within the data segment (s3) int addr: the address of a delimiter relative to the start of data The segment information makes it possible to determine the segment, including the start frame, on the basis of the information on the start frame specified by the user. In addition, a data reading position on the disc can be determined immediately on the basis of the relative address of the delimiter. Thus, processing with a short seek time in reading the data to be processed is made possible.

At step S232, the thread A 312 performs processing to read the data from the data segment region on the disc storing the frame specified for reproduction, to divide the data into audio data and video data, to store audio data from the start frame specified for reproduction on down in the audio data FIFO 321, and to store video data from the start frame specified for reproduction on down in the video data FIFO 323. The thread B performs processing to decode the video data and to store the decoded video data from the frame specified for reproduction on down in the decoded video data FIFO 324.

At step S233, the data processing apparatus stands by until the audio reproduction processing unit 311 and the video reproduction processing unit 314 are able to perform instant reproduction.

Returning to the flowchart of FIG. 8, the description of the procedure of the content data reproduction process will be continued. When the preloading process at step S104 is completed, the process proceeds to step S105 to perform reproduction processing. The reproduction processing is performed as processes in which the audio reproduction processing unit 311 and the video reproduction processing unit 314 output synchronized reproduced data to the audio output unit 332 and the video display unit 333, respectively.

The reproduction processing continues to be performed until the end of the content being reproduced unless another command is input. In this case, as the processing of the thread A, audio data and video data of subsequent data segments are sequentially input to the audio data FIFO 321 and the video data FIFO 323. Also, the thread B continues the processing of extracting data from the video data FIFO 323, decoding the data, and storing the decoded video data in the decoded video data FIFO 324.

Since the maximum required areas corresponding to the content being reproduced are secured in advance as data storing areas of the respective FIFOs, a shortage of memory areas or the like does not occur in this continuous data reproduction process, and therefore smooth reproduction processing can be performed.

When a pause command is input at step S106, a pause process is performed at step S121. The pause process stops the process of outputting reproduced data at the audio reproduction processing unit 311 and the video reproduction processing unit 314. The data of each FIFO is retained, and the processing of the thread A 312 and the thread B 313 is continued as long as there is free space in each FIFO. When the pause is cancelled at step S122, the process returns to step S105 to resume reproduction processing.

When a command to stop the reproduction is input from the user via the input unit at step S107, the process proceeds to step S123 to perform a reproduction stop process.

Figure 12:
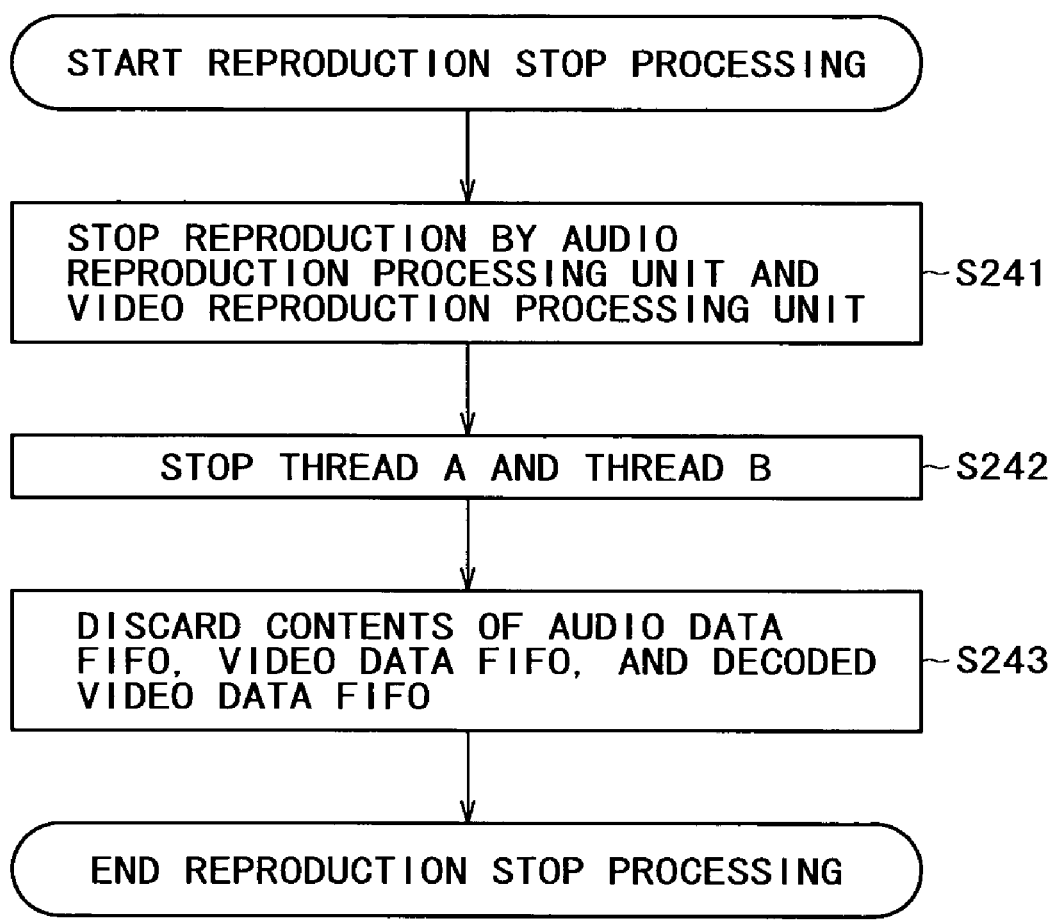
FIG. 12 is a flowchart of assistance in explaining a reproduction stop process in the content reproduction process according to the present invention.

Details of the reproduction stop process will be described with reference to the flowchart of FIG. 12. First, at step S241, the process of outputting reproduced data at the audio reproduction processing unit 311 and the video reproduction processing unit 314 is stopped. Then, at step S242, the processing of the thread A 312 and the thread B 313 is stopped.

At the next step S243, the data stored in each of the audio data FIFO 321, the video data FIFO 323, and the decoded video data FIFO 324 is discarded.

As a result of the above, the reproduction stop process is completed. Incidentally, at this time, the physical start addresses, the header information, and the segment information of the contents, which are stored in the cache unit 322, are retained. Hence, when the process returns to step S102 in the flowchart of FIG. 8 and a command to start reproduction is input, the storing of data in the FIFOs on the basis of the cached information and the reproduction of the data can be performed immediately. Incidentally, in this case, the FIFO securing process at step S103 has already been performed, and is thus skipped.

When a command to end content reproduction is input or reproduction to an end of the content is ended at step S108, a content reproduction ending process is performed at step S109.

Figure 13:
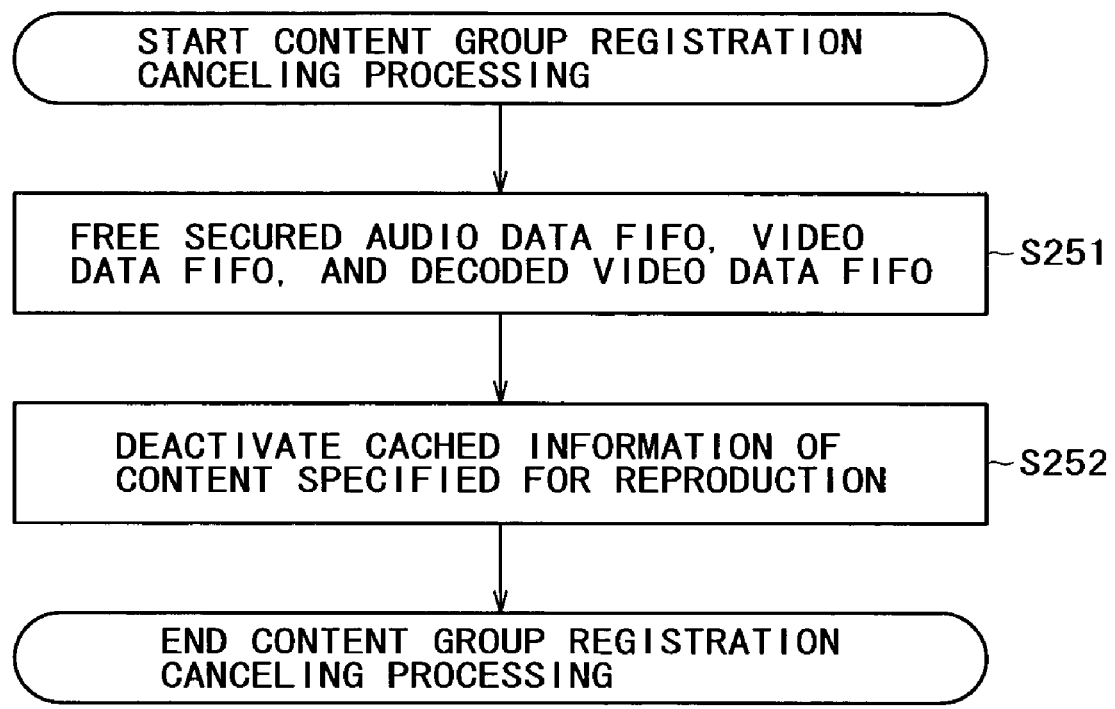
FIG. 13 is a flowchart of assistance in explaining a content group registration canceling process in the content reproduction process according to the present invention.

The content reproduction ending process will be described with reference to the flowchart of FIG. 13. At step S251, the audio data FIFO 321, the video data FIFO 323, and the decoded video data FIFO 324 secured in the data storing unit 320 (see FIG. 7) are each freed. At step S252, the cached information of the content specified for reproduction is deactivated. This represents a process of canceling a state of reading data from the cache at each thread. At this time, the cached information is not discarded. Hence, when the ending of the content reproduction is not confirmed by the user at step S110 in the flowchart of FIG. 8 and a command to start reproduction is input again at step S102, FIFO setting and reproduction processing are performed immediately on the basis of the cached information.

When the ending of the content reproduction is confirmed by the user by inputting a command, extracting the disc storing the content, or the like at step S110, a content group registration canceling process is performed, that is, the content physical address, the header information, and the segment information stored in the cache unit 322 are discarded at step S111.

As described above, in the content data reproduction process, first a content physical address, header information, and segment information are stored in the cache unit; the audio data FIFO, the video data FIFO, and the decoded video data FIFO are each secured according to the information stored in the cache on the basis of information for specifying a frame to be reproduced from the input unit; and reproduction from the arbitrary frame can be performed by the processing of each of the plurality of threads and the audio and video processing units. Further, various processes corresponding to process phases, such as a pause, a reproduction stop, a reproduction end, and the like, are performed, whereby reproduction can be resumed immediately.

Further, header information and the like of a content to which a frame specified by a command to start reproduction belongs are cached, and FIFO areas are set dynamically on the basis of the cached information. It is therefore possible to secure memory areas immediately in response to a jump, a program search, or other process and to read data on the basis of the cached information. Thus, efficient decode and reproduction processes with shortened processing time can be performed.

The present invention has been explained above in detail with reference to a specific embodiment thereof. It is obvious, however, that modifications and substitutions in the embodiment may be made by those skilled in the art without departing from the spirit of the present invention. That is, the present invention has been disclosed by an embodiment to be considered illustrative but not restrictive. In order to determine the spirit of the present invention, the section of claims is to be considered.

The series of processes described in the specification can be carried out by hardware, by software, or by a combined configuration of both. When the processes are to be carried out by software, the processes can be carried out by installing a program in which a process sequence is recorded onto a memory within a computer that is incorporated in dedicated hardware and then executing the program, or by installing the program onto a general-purpose computer that can perform various processes, and then executing the program.

The program can be recorded in advance on a hard disc or in a ROM (Read Only Memory) as a recording medium, for example. Alternatively, the program can be stored (recorded) temporarily or permanently on a removable recording medium, such as a flexible disc, a CD-ROM (Compact Disc Read Only Memory), an MO (Magneto Optical) disc, a DVD (Digital Versatile Disc), a magnetic disc, a semiconductor memory, or the like. Such removable recording media can be provided as so-called packaged software.

In addition to being installed in a computer from a removable recording medium as described above, the program may be transferred by radio from a download site to a computer or transferred to a computer by wire via a network, such as a LAN (Local Area Network), the Internet, or the like. The computer receives the program thus transferred thereto and installs the program onto a recording medium, such as a built-in hard disc or the like.

The various processes described in the present specification may be carried out not only in time series in the described order, but also in parallel or individually according to the processing capability of an apparatus performing the processing or as required. In the present specification, a system refers to a logical set configuration of a plurality of apparatus, and the apparatus of the configuration are not necessarily present within the same housing.

As described above, according to the present invention, the physical start address of each content stored on an information storing medium, such as a DVD, a CD, or the like, and header information and segment information as additional information corresponding to each content, are stored in a cache unit, maximum FIFO areas required for decoding and reproducing a content are calculated on the basis of information on the content specified for reproduction processing and the cached information, and areas for each of an audio data FIFO, a video data FIFO, and a decoded video data FIFO are set. Therefore, a necessary and sufficient area for each of the FIFOs is set efficiently, and the content can be reproduced without memory shortage or the like in reproduction processing. Also, in processing for a content change, a program search, a jump, or the like, FIFO areas of the proper size can be set dynamically on the basis of the cached information, and thus a smooth reproduced data change can be made when the content change, program search, jump, or the like is performed.

Further, a data processing apparatus according to the present invention includes a first thread for reading a data segment including frame data to be reproduced from the information storing medium on the basis of reproduction processing specifying information and the cached information, dividing the data stored in the data segment into audio data and video data, and storing the audio data in the audio data FIFO and the video data in the video data FIFO; a second thread for decoding the video data stored in the video data FIFO and storing the video data from a frame specified for reproduction in the decoded video data FIFO; an audio reproduction processing unit for performing reproduction processing on the basis of the audio data stored in the audio data FIFO; and a video reproduction processing unit for performing reproduction processing on the basis of the decoded video data stored in the decoded video data FIFO. Each processing unit stores data in the FIFOs or processes the FIFO stored data. Therefore, processing making the most of the processing speed of each processing thread or processing unit can be performed. Thus, efficient processing can be performed.

Further, according to the present invention, an information storing medium storing coded data of a content in segment units stores data including information of a horizontal video size, a vertical video size, a video depth, a maximum video data size in data segments, and a maximum audio data size in data segments as header information corresponding to the content. The information storing medium also includes information of the first frame number within a data segment, the number of frames within the data segment, and the address of each delimiter relative to the start of data as segment information. Therefore, a data reproduction processing apparatus can cache these pieces of information and quickly perform FIFO setting and data reading using the cached information. The data reproduction processing apparatus can thus perform efficient data decoding and reproducing processing.

The invention claimed is:

1. A data processing apparatus for decoding and reproducing coded data, said apparatus comprising:
   a cache unit operable to store cached information including a physical start address of each content stored on an information storing medium and additional information corresponding to each content;
   a FIFO control unit operable to obtain from said cache unit additional information corresponding to a content to be reproduced, and to set storage areas for an audio data FIFO, a video data FIFO, and a decoded video data FIFO on the basis of the additional information corresponding to the content to be reproduced; and
   a data processing unit operable to obtain data from a data segment including data to be reproduced according to the physical start address of the content to be reproduced and the additional information corresponding to the content to be reproduced, to store one portion of the data in said audio data FIFO and another portion of the data in said video data FIFO, to obtain the another portion of the data from said video data FIFO, to decode the obtained data, to store the decoded data in said decoded video data FIFO, and to reproduce the one portion of the data stored in said audio data FIFO and the decoded data stored in said decoded video data FIFO.

2. The data processing apparatus as claimed in claim 1, wherein
   the additional information corresponding to each content includes header information and segment information for a corresponding content, the corresponding content having a plurality of data segments;
   the header information includes a horizontal video size, a vertical video size, a video depth, a maximum video data size in the plurality of data segments, and a maximum audio data size in the plurality of data segments for the corresponding content;
   the segment information includes a first frame number for each of the plurality of data segments, a number of frames in each of the plurality of data segments, and an address of delimiter information corresponding to each of the plurality of data segments relative to a start of data; and
   said FIFO control unit calculates maximum FIFO storage areas required for decoding and reproducing the content to be reproduced on the basis of information specifying the content to be reproduced and the additional information corresponding to the content to be reproduced, and sets said storage areas for said audio data FIFO, said video data FIFO, and said decoded video data FIFO.

3. The data processing apparatus as claimed in claim 2, wherein
   said FIFO control unit calculates a size of said storage area for said video data FIFO in bytes according to (maximum video data size×P)

and calculates a size of said storage area for said audio data FIFO in bytes according to (maximum audio data size×P), where P is a number of segments to be stored in said video data FIFO and said audio data FIFO, and the maximum video data size and the maximum audio data size are obtained from the cached information stored in said cache unit.

4. The data processing apparatus as claimed in claim 2, wherein
   said FIFO control unit calculates a size of said storage area for said decoded video data FIFO in bytes according to (horizontal video size×vertical video size×video depth×p)

where p is a number of frames to be stored in said decoded video data FIFO, and the horizontal video size, the vertical video size and the video depth are obtained from the cached information stored in said cache unit.

5. The data processing apparatus as claimed in claim 1, wherein said data processing unit processes:
   a first thread which reads a data segment including frame data to be reproduced from said information storing medium, divides data stored in the data segment into audio data and video data, stores the audio data in said audio data FIFO, and stores the video data in said video data FIFO; and
   a second thread which decodes the video data stored in said video data FIFO and stores the decoded video data from a frame specified for reproduction in said decoded video data FIFO.

6. The data processing apparatus as claimed in claim 5, wherein said data processing unit includes:
   an audio reproduction processing unit operable to perform reproduction processing on the basis of the audio data stored in said audio data FIFO; and a video reproduction processing unit operable to perform reproduction processing on the basis of the decoded video data stored in said decoded video data FIFO.

7. An information storing medium storing data for reproducing a content, said data comprising:
a plurality of data segments forming the content;
header information corresponding to the content;
segment information corresponding to the content; and
delimiter information corresponding to each data segment;
said header information including a horizontal video size, a vertical video size, a video depth, a maximum video data size of the plurality of data segments, and a maximum audio data size of the plurality of data segments; and
said segment information including a first frame number for each of the plurality of data segments, a number of frames in each of the plurality of data segments, and an address of delimiter information corresponding to each of the plurality of data segments relative to a start of data.

8. The information storing medium as claimed in claim 7, wherein said delimiter information includes a first frame number within a data segment, a number of frames within the data segment, a video data size within the data segment, and an audio data size within the data segment.

9. A data processing method for decoding and reproducing coded data, said method comprising:
storing cache information including a physical start address of each content stored on an information storing medium and additional information corresponding to each content;
obtaining additional information corresponding to a content to be reproduced, and setting storage areas for an audio data FIFO, a video data FIFO, and a decoded video data FIFO on the basis of the additional information corresponding to the content to be reproduced; and
performing a data processing process including obtaining data from a data segment including data to be reproduced according to the physical start address of the content to be reproduced and the additional information corresponding to the content to be reproduced, storing one portion of the data in said audio data FIFO and another portion of the data in said video data FIFO, obtaining the another portion of the data from said video data FIFO, decoding the obtained data, storing the decoded data in said decoded video data FIFO, and reproducing the one portion of the data stored in said audio data FIFO and the decoded data stored in said decoded video data FIFO.

10. The data processing method as claimed in claim 9, wherein
the additional information corresponding to each content includes header information and segment information for a corresponding content, the corresponding content having a plurality of data segments;
the header information includes a horizontal video size, a vertical video size, a video depth, a maximum video data size in the plurality of data segments, and a maximum audio data size in the plurality of data segments; and
the segment information includes a first frame number for each of the plurality of data segments, a number of frames in each of the plurality of data segments, and an address of delimiter information corresponding to each of the plurality of data segments relative to a start of data;
said method further including calculating maximum FIFO storage areas required for decoding and reproducing the content to be reproduced on the basis of information specifying the content to be reproduced and the additional information corresponding to the content to be reproduced, and setting said storage areas for said audio data FIFO, said video data FIFO, and said decoded video data FIFO.

11. The data processing method as claimed in claim 10, wherein
said calculating step includes calculating a size of said storage area for said video data FIFO in bytes according to (maximum video data size×P)

and calculating a size of said storage area for said audio data FIFO in bytes according to (maximum audio data size×P), where P is a number of segments to be stored in said video data FIFO and said audio data FIFO, and the maximum video data size and the maximum audio data size are obtained from the cached information stored in said storing step.

12. The data processing method as claimed in claim 10, wherein
said calculating step includes calculating a size of said storage area for said decoded video data FIFO in bytes according to (horizontal video size×vertical video size×video depth×p)

where p is a number of frames to be stored in said decoded video data FIFO, and the horizontal video size, the vertical video size and the video depth are obtained from the cached information stored in said storing step.

13. The data processing method as claimed in claim 9, wherein said data processing process further includes:
performing a first thread including reading a data segment including frame data to be reproduced from said information storing medium, dividing data stored in the data segment into audio data and video data, storing the audio data in said audio data FIFO, and storing the video data in said video data FIFO; and
performing a second thread including decoding the video data stored in said video data FIFO and storing the decoded video data from a frame specified for reproduction in said decoded video data FIFO.

14. A recording medium recorded with a computer program for decoding and reproducing coded data, said program comprising:
storing cache information including a physical start address of each content stored on an information storing medium and additional information corresponding to each content;
obtaining additional information corresponding to a content to be reproduced, and setting storage areas for an audio data FIFO, a video data FIFO, and a decoded video data FIFO on the basis of the additional information corresponding to the content to be reproduced; and
performing a data processing process including obtaining data from a data segment including data to be reproduced according to the physical start address of the content to be reproduced and the additional information corresponding to the content to be reproduced, storing one portion of the data in said audio data FIFO and another portion of the data in said video data FIFO, obtaining the another portion of the data from said video data FIFO, decoding the obtained data, storing the decoded data in said decoded video data FIFO, and reproducing the one portion of the data stored in said audio data FIFO and the decoded data stored in said decoded video data FIFO.

* * * * *